US009232546B2

United States Patent
Lauer et al.

(10) Patent No.: US 9,232,546 B2
(45) Date of Patent: Jan. 5, 2016

(54) SYSTEMS AND METHODS FOR TWO-PART ELECTRONIC DEVICE REGISTRATION

(71) Applicant: GOGO LLC, Itasca, IL (US)

(72) Inventors: Bryan Adrian Lauer, Hinckley, IL (US); Kathy Wang, Buffalo Grove, IL (US); Tony LaMarca, Loves Park, IL (US); Paresh Kanabar, Naperville, IL (US); Premkumar Bangole, Bloomingdale, IL (US); Pat Walsh, Naperville, IL (US)

(73) Assignee: GOGO LLC, Chicago, IL (US)

(*) Notice: Subject to any disclaimer, the term of this patent is extended or adjusted under 35 U.S.C. 154(b) by 34 days.

(21) Appl. No.: 14/291,558

(22) Filed: May 30, 2014

(65) Prior Publication Data

US 2015/0133117 A1 May 14, 2015

Related U.S. Application Data

(60) Provisional application No. 61/901,659, filed on Nov. 8, 2013.

(51) Int. Cl.
*H04W 4/00* (2009.01)
*H04W 76/02* (2009.01)
(Continued)

(52) U.S. Cl.
CPC .............. *H04W 76/02* (2013.01); *H04W 8/12* (2013.01); *H04W 84/005* (2013.01)

(58) Field of Classification Search
CPC ....... H04W 12/06; H04W 4/24; H04W 4/001; H04W 4/003; H04W 8/04; H04W 8/10; H04W 8/26; H04W 60/00; H04W 8/183; H04W 4/005; H04W 76/02; H04W 8/12; H04W 8/18; H04W 8/265; H04W 12/04; H04W 24/00

USPC .......................... 455/435.1–435.3, 432.1–434
See application file for complete search history.

(56) References Cited

U.S. PATENT DOCUMENTS

| 5,546,397 A | 8/1996 | Mahany |
| 5,557,656 A | 9/1996 | Ray et al. |

(Continued)

FOREIGN PATENT DOCUMENTS

| EP | 0902551 A2 | 3/1999 |
| EP | 1976152 A1 | 10/2008 |
| EP | 2568533 A1 | 3/2013 |

OTHER PUBLICATIONS

"Aero Mobile Terminals: Models 2540/2532" Product Sheet, ViaSat, 2 pp. (2012).

(Continued)

*Primary Examiner* — Ronald Eisner
(74) *Attorney, Agent, or Firm* — Marshall, Gerstein & Borun LLP; Randall G. Rueth

(57) ABSTRACT

Embodiments are provided for registering an electronic device of a subscriber for cellular-based communications. According to certain aspects, the cellular-based communications may be facilitated by a data center while the electronic device is not easily within range of a cellular network, such as when the electronic device is traveling on an aircraft. A first, ground-based part of the registration includes creating an account for the electronic device that indicates an identification of the electronic device retrieved from a home network of the subscriber. A second, air-based part of the registration includes connecting to the electronic device via an on-board communications system and communicating with the home network to indicate that the location of the electronic device is known.

20 Claims, 9 Drawing Sheets

(51) Int. Cl.
*H04W 8/12* (2009.01)
*H04W 84/00* (2009.01)

(56) References Cited

U.S. PATENT DOCUMENTS

| | | | |
|---|---|---|---|
| 5,652,795 | A | 7/1997 | Dillon et al. |
| 5,699,384 | A | 12/1997 | Dillon |
| 5,722,074 | A | 2/1998 | Muszynski |
| 5,740,366 | A | 4/1998 | Mahany et al. |
| 5,844,893 | A | 12/1998 | Gollnick et al. |
| 5,940,771 | A | 8/1999 | Gollnick et al. |
| 5,995,725 | A | 11/1999 | Dillon |
| 5,995,726 | A | 11/1999 | Dillon |
| 6,009,328 | A | 12/1999 | Muszynski |
| 6,016,388 | A | 1/2000 | Dillon |
| 6,125,184 | A | 9/2000 | Dillon et al. |
| 6,131,160 | A | 10/2000 | Dillon et al. |
| 6,161,141 | A | 12/2000 | Dillon |
| 6,310,582 | B1 | 10/2001 | Uetake et al. |
| 6,374,311 | B1 | 4/2002 | Mahany et al. |
| 6,665,536 | B1 | 12/2003 | Mahany |
| 6,697,415 | B1 | 2/2004 | Mahany |
| 6,714,559 | B1 | 3/2004 | Meier |
| 6,788,935 | B1 | 9/2004 | McKenna et al. |
| 7,013,138 | B2 | 3/2006 | Mahany |
| 7,062,268 | B2 | 6/2006 | McKenna |
| 7,107,062 | B2 | 9/2006 | Cruz et al. |
| 7,386,002 | B2 | 6/2008 | Meier |
| 7,457,646 | B2 | 11/2008 | Mahany et al. |
| 7,535,921 | B2 | 5/2009 | Meier |
| 7,536,167 | B2 | 5/2009 | Gollnick et al. |
| 7,548,553 | B2 | 6/2009 | Meier |
| 7,558,569 | B2 | 7/2009 | Chang et al. |
| 7,636,552 | B2 | 12/2009 | Monk |
| 7,702,328 | B2 | 4/2010 | Lemond et al. |
| 7,710,907 | B2 | 5/2010 | Mahany |
| 7,751,814 | B2 | 7/2010 | Cruz et al. |
| 7,873,343 | B2 | 1/2011 | Gollnick et al. |
| 7,916,747 | B2 | 3/2011 | Meier |
| RE42,536 | E | 7/2011 | Leuca et al. |
| 8,068,829 | B2 | 11/2011 | Lemond et al. |
| 8,078,163 | B2 | 12/2011 | Lemond et al. |
| 8,094,605 | B2 | 1/2012 | Lynch et al. |
| 8,169,946 | B2 | 5/2012 | Lynch et al. |
| 8,280,309 | B2 | 10/2012 | Monk |
| 8,452,276 | B2 | 5/2013 | Lauer |
| 2002/0170060 | A1 | 11/2002 | Lyman |
| 2006/0229070 | A1 | 10/2006 | de La Chapelle et al. |
| 2007/0021117 | A1 | 1/2007 | McKenna et al. |
| 2007/0042772 | A1 | 2/2007 | Salkini et al. |
| 2008/0004016 | A1 | 1/2008 | Smee et al. |
| 2008/0182573 | A1* | 7/2008 | Lauer .............. H04B 7/18506 455/431 |
| 2011/0265128 | A1 | 10/2011 | Bengeult et al. |
| 2015/0131519 | A1* | 5/2015 | Kanabar .............. H04B 7/14 370/315 |
| 2015/0133116 | A1* | 5/2015 | Lauer .............. H04W 4/14 455/435.1 |
| 2015/0133117 | A1* | 5/2015 | Lauer .............. H04W 8/12 455/435.1 |

OTHER PUBLICATIONS

"Direcway™ DW3000/DW4000 Series Systems: Satisfying the Need for Speed for the Multimedia Internet," Hughes Network Systems, 2 pp. (Jun. 2001).

"Exede® Internet: Fastest In-Flight Wi-Fi Unleash the Internet," ViaSat, 4 pp. (2012).

"Gogo Partners with AeroSat to Bring Ku-Satellite Service to Market," Gogo LLC, 2 pp. (May 18, 2012).

"Hughes and ThinKom Demonstrate New Tactical Communications Solutions," press release, Hughes Network Systems, LLC, 2 pp. (Oct. 25, 2012).

"Hughes HX200 Broadband Satellite Router," Hughes Network Systems, LLC, 2 pp. (2012).

ETSI Technical Specification 102 441 (v1.1.1), "Digital Video Broadcasting (DVB); DVB-S2 Adaptive Coding and Modulation for Broadband Hybrid Satellite Dialup Applications", European Telecommunications Standards Institute (ETSI), European Broadcasting Union, 23 pp. (2005).

European Standard 301 195 (v1.1.1), "Digital Video Broadcasting (DVB); Interaction channel through the Global System for Mobile communications (GSM)," European Telecommunications Standards Institute (ETSI), 14 pp. (Feb. 1999).

European Telecommunication Standard (ETS 300 801), "Digital Video Broadcasting (DVB); Interaction channel through Public Switched Telecommunications Network (PSTN) / Integrated Services Digital Networks (ISDN)," European Telecommunications Standards Institute (ETSI), 14 pp. (Aug. 1997).

* cited by examiner

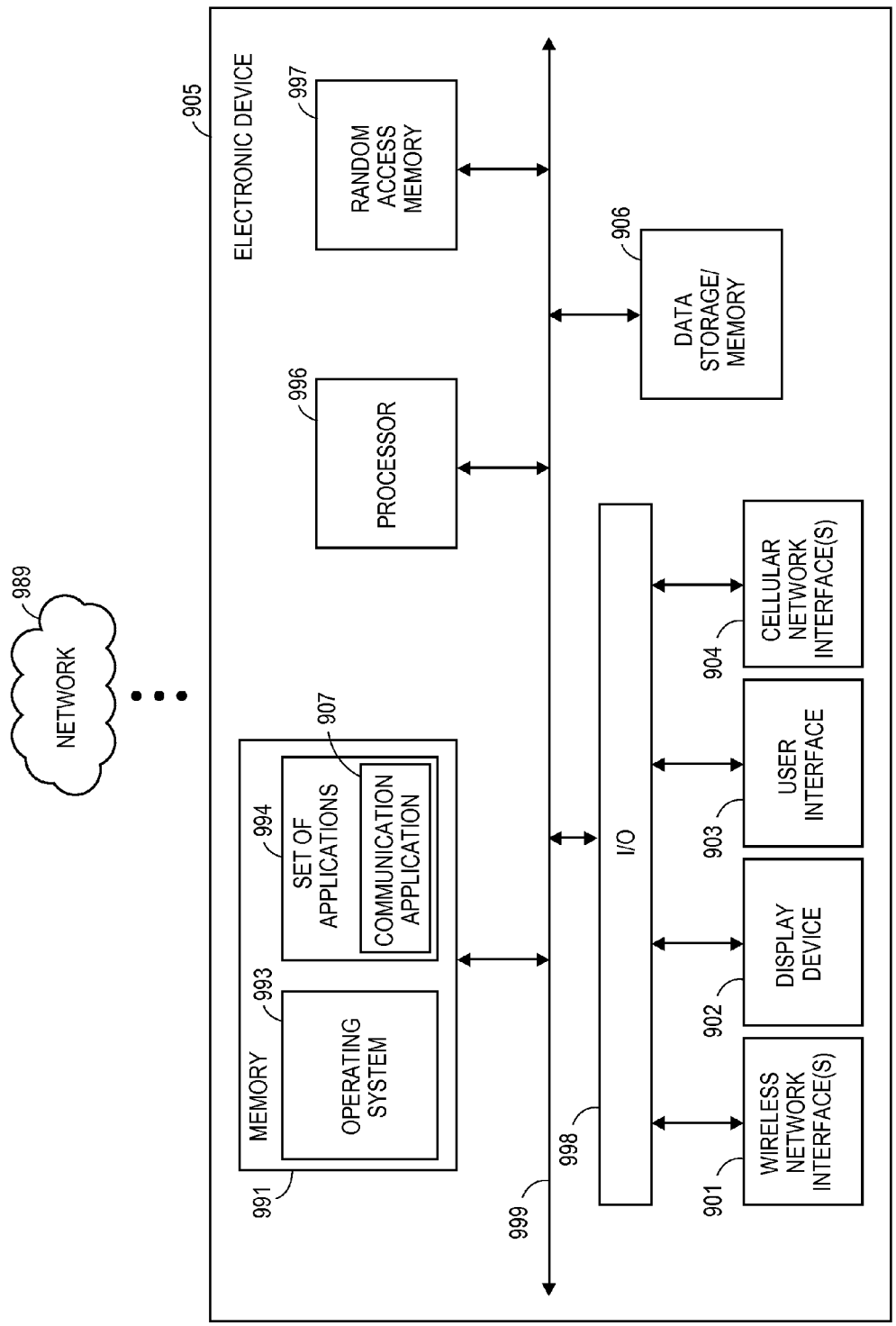

SYSTEMS AND METHODS FOR TWO-PART ELECTRONIC DEVICE REGISTRATION

CROSS-REFERENCE TO RELATED APPLICATIONS

This application claims the benefit of U.S. Provisional Application No. 61/901,659, filed Nov. 8, 2013, which is incorporated by reference herein.

FIELD

The present disclosure generally relates to non-terrestrial communications and, in particular, to systems, methods and techniques for configuring an electronic device to send and receive cellular-based communications while connected to a non-terrestrial communication network.

BACKGROUND

Currently, existing airlines and other transportation companies provide communication services to mobile or wireless devices (e.g., cellular phones, smart devices, laptops, tablet computers, etc.) when such devices are on-board a vehicle while the vehicle is in en route to a destination. However, the delivery of terrestrial or native features (e.g., roaming, texting, simultaneous calls, etc.) to mobile or wireless devices while a vehicle is in transit presents difficulties. Typically, to support native, terrestrial features of a mobile or wireless device in a non-terrestrial environment, cellular base stations such as "picocells" are installed on-board the vehicle, and the mobile device connects, via the cellular radio of the mobile device and the on-board cellular base stations, to an on-board network. In some cases, hardware in addition to the cellular base stations is also installed on-board the vehicle. This extraneous infrastructure is both limiting and extremely expensive. Moreover, the radio transmissions produced on-board the vehicle may interfere with ground-based cellular systems. For example, if mobile devices on-board the vehicle cannot find an adequate cellular band to which they may connect (e.g., when on-board cellular base stations are deactivated), the mobile devices will automatically increase their power, which may interfere with ground-based terrestrial cell sites as well as quickly drain the batteries of the mobile devices.

Some existing terrestrial communications systems are able to provide internet-based network connections to mobile devices while on-board a vehicle. For example, some communications systems are equipped with Wi-Fi capability that enables the mobile device to access websites and stream multimedia. However, these communications systems are not able to provide mobile devices with terrestrial or native communication features (i.e., cellular-based communications) while the mobile devices are on-board the vehicle.

Accordingly, there is an opportunity to leverage existing communications infrastructure to configure electronic devices to send and receive cellular-based communications while the electronic devices are connected to a non-terrestrial communications network. In particular, there is an opportunity for systems and methods to securely register electronic devices for cellular-based communications via a non-terrestrial network.

SUMMARY

In an embodiment, a method of registering an electronic device of a subscriber is provided. The method includes facilitating a ground-based network registration including receiving a communication initiated by the electronic device, retrieving, using information in the communication, an identification of the electronic device from a home network of the subscriber, and creating, with one or more processors, an account for the subscriber, the account including the identification of the electronic device. The method further includes, after facilitating the ground-based network registration, facilitating a non-terrestrial network-based registration including receiving a connection request initiated by the electronic device while the electronic device is in communication with a non-terrestrial network, responsive to receiving the connection request, establishing a secure communication channel with the electronic device, and providing an update for the electronic device to the home network of the subscriber.

In another embodiment, a system for registering an electronic device of a subscriber is provided. The system includes an interface configured to provide at least one communicative connection to a ground-based network, a non-ground-based network, and a home network of the subscriber. The system further includes a registration server communicatively connected to the interface and configured to, when the electronic device is connected to the ground-based network, receive, via the interface, a communication initiated by the electronic device, retrieve, using information in the communication, an identification of the electronic device from the home network of the subscriber, and create an account for the subscriber, the account including the identification of the electronic device. After the account is created for the subscriber, the registration server is further configured to receive, via the interface, a connection request initiated by the electronic device while the electronic device is in communication with the non-ground-based network, establish a secure communication channel with the electronic device, and provide, via the interface, an update for the electronic device to the home network of the subscriber.

In a further embodiment, a method of registering the electronic device of a subscriber is provided. The method includes facilitating a ground-based network registration including sending a communication indicating a subscription identification to a registration server, wherein the registration server uses the subscription identification to retrieve an identification of the electronic device from a home network of the subscriber, and receiving, from the registration server, a notification that an account has been established for the subscriber using the identification of the electronic device. The method, after facilitating the ground-based network registration, is further configured to facilitate a non-terrestrial network-based registration including initiating a connection request to the registration server while the electronic device is in communication with a non-terrestrial network, and responsive to initiating the connection request, establishing a secure communication channel with the registration server, wherein the registration server provides an update for the electronic device to the home network of the subscriber.

BRIEF DESCRIPTION OF THE DRAWINGS

FIG. 9 is a block diagram of an electronic device in accordance with some embodiments.

DETAILED DESCRIPTION

Figure 1:
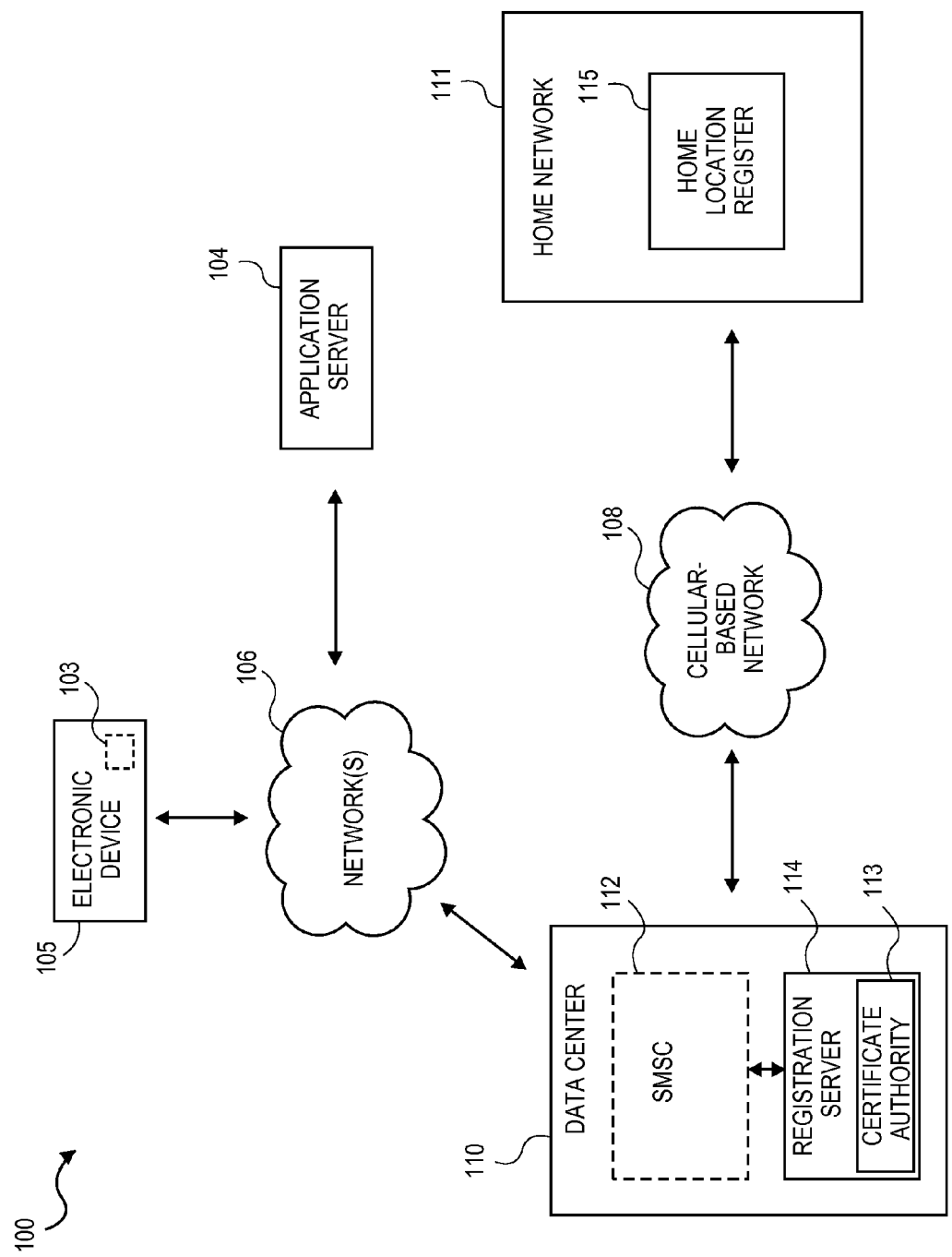
FIG. 1 illustrates an exemplary representation of electronic devices and components capable of facilitating a ground-based registration of an electronic device, in accordance with some embodiments.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

The systems and methods as discussed herein offer an efficient and effective technique for enabling electronic devices to engage in cellular-based communications while not in range of or otherwise connected to a corresponding cellular-based network. In particular, the systems and methods enable electronic devices to roam in a cellular-based network, send and receive text messages (e.g., SMS messages), and originate and terminate voice calls while the electronic devices are connected to a wireless network on a vehicle such as an airplane. The systems and methods facilitate the resulting cellular-based communications as if the electronic devices are roaming in a cellular environment. Thus, the telephone numbers (or other subscription identifications) associated with the electronic devices are provided to destination devices so as to provide full transparency to the users of the destination devices. For example, a receiving party's smart phone will display the telephone number of an in-air smart phone upon receipt of a voice call initiated by the in-air smart phone.

As a result, the systems and methods enable "feature transparency," which generally refers to providing features that are native to or provided at wireless devices in a terrestrial environment (e.g., while the wireless devices are being serviced by cell sites or wireless access points that are connected to a structure that is physically and fixedly connected to the ground), to the wireless devices when the wireless devices are in a non-terrestrial environment, (e.g., while the wireless devices are being serviced by wireless access points that are connected to a structure that is fixedly connected to a vehicle), such as while the wireless or mobile device is being transported by an aircraft in flight or by a sailing boat.

The systems and methods may be facilitated by a back-end end registration server as well as a communication application installed on an electronic device. A user interacts with the electronic device to enable the electronic device to perform a two-part registration, where the first part of the registration is performed when the electronic device is connected to a ground-based (i.e., terrestrial) network and the second part of the registration is performed when the electronic device is connected to a non-ground-based (i.e., non-terrestrial) network. During the ground-based registration, the electronic device sends a communication (e.g., an SMS) to the registration server, wherein the communication identifies a cellular service provider associated the electronic device. The registration server retrieves, from a home network associated with the cellular service provider, a unique identification of the electronic device itself. Further, the registration server creates an application account using the device identification, and further generates and issues a digital certificate to the electronic device using the device identification.

During the air-based registration, which for example may be facilitated during a flight, the electronic device connects to an access point on the aircraft and the user of the electronic device selects a desired service or product for cellular connectivity (e.g., two hours of connectivity). The electronic device connects, via an on-board communications network system, to the registration server using the certificate generated during the ground-based registration. In response to authenticating the certificate and establishing a secure connection with the electronic device, the registration server sends a location update for the electronic device to the home network of the user and the home network updates its home location register (HLR) accordingly. Therefore, the location of the electronic device is known within the terrestrial mobile network and the electronic device is configured to roam, as well as send and receive text messages and voice calls using the native subscription information.

The systems and methods offer numerous advantages and benefits. In particular, the systems and methods enable a subscriber's electronic device to be configured for cellular-based communications while the electronic device is not connected to a cellular-based network, thus increasing user availability and general communications capability. Further, the two-part registration enables the registration server to verify the identity of the electronic device, thus providing the subscriber with added security and limiting instances of "spoofing." It should be appreciated that other advantages and benefits of the systems and methods are envisioned.

FIG. 1 illustrates an example representation 100 of components configured to facilitate a ground-based registration of an electronic device 105 with a registration server 114. As described herein, the ground-based registration is performed when the electronic device 105 is connected to a ground-based data and/or communications network. Generally, as referred to herein, a "ground" or "ground-based" network refers to any network that electronic devices may connect to while in a terrestrial environment, but may not easily communicate via while being transported by a high-speed or high-elevation vehicle such as an airplane. Typically, ground systems and ground computing devices may be essentially fixed in location, and base stations or infrastructure containing equipment via which devices may wirelessly access the ground system may be contained in one or more buildings or other structures that are fixedly attached to the ground or to earth. Although FIG. 1 describes the registration as a ground-based registration, it should be appreciated that the registration may also be performed in a non-ground-based (i.e., non-terrestrial) communications network. For example, the electronic device 105 and the registration server 114 may both be located on board an aircraft, where the registration may be facilitated via an on-board communications network system.

The electronic device 105 may be any type of standalone or portable electronic device capable of communicating via one or more networks. For example, the electronic device 105 may be a mobile phone, a Personal Digital Assistant (PDA), a smart phone, a tablet computer, a multimedia player, a desktop or notebook computer, an MP3 player, a digital broadcast receiver, or any other electronic apparatus. The electronic device 105 may also have a subscription or plan with a cellular services provider, whereby the cellular services provider supports cellular communications conducted via the electronic device 105. The registration server 114 may any combination of hardware and software elements configured to communicate with the electronic device 105 and facilitate the functionalities described herein.

As illustrated in FIG. 1, the electronic device 105 is configured to connect to one or more ground-based networks 106. In embodiments, the network 106 may be a wired or wireless wide area network (WAN); however it should be appreciated that the network 106 may also be a local area network (LAN) or personal area network (PAN). Further, the network 106 can facilitate any type of data communication via any wired or wireless standard or technology (e.g., GSM, CDMA, TDMA, WCDMA, LTE, EDGE, OFDM, GPRS, EV-DO, UWB, IEEE 802 including Ethernet, WiMAX, WiFi, Bluetooth, and others). The electronic device 105 is configured to connect to an application server 104 via the one or more networks 106. The application server 104 may be a digital distribution platform for providing one or more applications to one or more requesting devices. For example, the application server 104 may be the Google Play™ platform, the Apple® App Store℠ platform, the Windows Phone Store™ platform, the BlackBerry World™ platform, or other platforms.

According to embodiments, the electronic device 105 can download and install a communication application 103 from the application server 104. The communication application 103 may be developed and/or offered by the registration server 114, whereby the communication application 103 enables the electronic device 105 to register with the registration server 114. In particular, a user of the electronic device 105 can perform the ground-based registration with the registration server 114 to create an account with the communication application 103. After the account for the communication application 103 is created, the user may perform a secondary air-based registration with the registration server 114 (as discussed with respect to FIGS. 3 and 4) to securely register the electronic device 105 with the registration server and to enable the electronic device 105 to communicate over various air-borne communication networks, such as an air-to-ground (ATG) communication network for aircraft use. For example, the user may use the electronic device 105 while on an aircraft to send and receive cellular-based communications (e.g., text messages and phone calls).

As illustrated in FIG. 1, the registration server 114 may be a part of a data center 110 that also includes an optional short message service center (SMSC) 112 configured to facilitate various communications associated with the ground-based registration. It should be appreciated that the SMSC 112 may be separate from or included in the registration server 114, or may be managed by or separately managed from the registration server 114. The electronic device 105 can connect to the data center 110 via the one or more networks 106. It should be appreciated that the network used to connect the electronic device 105 to the application server 104 may be different from (or the same as) the network used to connect the electronic device 105 to the data center 110.

According to embodiments, a user of the electronic device 105 may initiate the ground-based registration via the communication application 103. In particular, the communication application 103 can connect to the registration server 114 via the network 106 (such as via a handshake protocol) and the registration server 114 can send a unique code to the communication application 103. A user of the electronic device 105 can input the unique code into the communication application 103, and the communication application 103 can generate a short message service (SMS) message that includes the unique code. In some embodiments, the user may use a dedicated SMS messaging application of the electronic device 105 to input the unique code, wherein the SMS messaging application generates the resulting SMS message. In any case, the resulting SMS message specifies a destination corresponding to the SMSC 112. Accordingly, the electronic device 105 can send the SMS message that includes the unique code to the SMSC 112 and, upon receipt, the SMSC 112 can forward the SMS message to the registration server 114. It should be appreciated that the electronic device 105 can send the SMS message directly to the registration server 114.

As illustrated in FIG. 1, the registration server 114 may connect to a home network 111 of the electronic device 105 via a cellular-based network 108. The cellular-based network 108 may be a wide area network (WAN) configured to facilitate any type of data communication via any standard or technology (e.g., GSM, CDMA, TDMA, WCDMA, LTE, EDGE, OFDM, GPRS, EV-DO, UWB, and others). Generally, the home network 111 of the electronic device 105 may be administered or provided by a cellular communications service provider with which the user (i.e., subscriber) of the electronic device 105 has an agreement to receive wireless communications services and features. Accordingly, the home network 111 of the electronic device 105 may administrate or manage a home location register (HLR) 115 and/or a visiting location register (VLR) (not shown in FIG. 1), among other databases or components, to support and manage cellular communication, roaming, and other features for the electronic device 105. Additionally, the cellular radio frequency (RF) communications band utilized by the home network 111 to wirelessly communicate with mobile devices may be an RF band designated for AMPs, TDMA, CDMA, GSM, PCS, 3G, 4G, 5G, and/or any other terrestrial cellular radio frequency band. Generally, a cellular radio frequency band is a portion of RF spectrum that is allocated by a governmental agency or other body which governs the usage of spectrum. In some networks, more than one cellular RF band may be supported.

The HLR 115 can include a database that stores identifications of electronic devices that are authorized to communicate via the home network 111. In particular, for each authorized device, the HLR 115 can store the corresponding international mobile subscriber identity (IMSI), which is a unique number that identifies each authorized device (or more particularly, identifies the SIM card of each authorized device). The HLR 115 can also pair each IMSI with a mobile subscriber integrated services digital network number (MSISDN) that corresponds to a telephone number of the authorized device.

According to embodiments, the registration server 114 can examine the SMS message sent by the electronic device 105 to identify a network subscription of the electronic device 105, or more particularly, to identify the MSISDN that is included in the SMS message, whereby the network subscription identifies the home network 111. Further, the registration server 114 can communicate with the HLR 115 of the home network 111 to verify whether the network subscription identification (e.g., MSISDN) of the electronic device 105 matches a network subscription identification stored in the HLR 115. If verified, the HLR 115 can retrieve the corresponding device identification (e.g., IMSI) paired with the stored network subscription identification and send the device identification to the registration server 114. The registration server 114 may create an account associated with the communication application 103 for a user of the electronic device 105. Further, a certificate authority 113 of the registration server 114 can generate and issue a digital certificate for the electronic device 105 according to various techniques. In embodiments, the certificate authority 113 can generate the certificate based on the identification of the electronic device 105 received from the HLR 115 of the home network 111.

Figure 2:
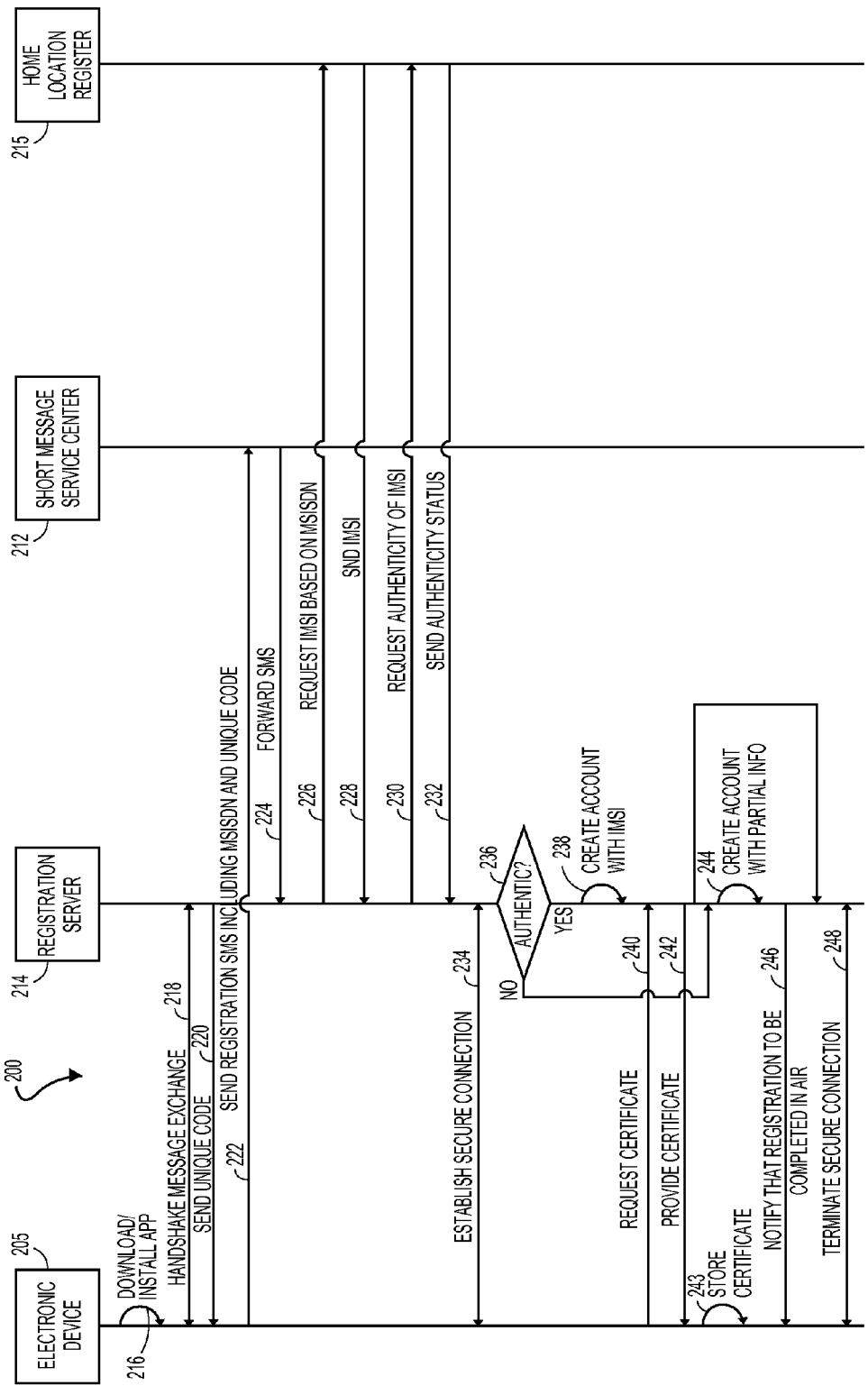
FIG. 2 depicts an example signal diagram associated with facilitating a ground-based registration of an electronic device, in accordance with some embodiments.

FIG. 2 illustrates a signal diagram 200 associated with facilitating a first, ground-based stage of a registration of a communication application installed on an electronic device. According to embodiments, the signal diagram 200 may be facilitated while an electronic device 205 is connected to a ground-based network. However, it should also be appreciated that the signal diagram 200 may be facilitated while the electronic device is connected to a non-ground-based network, such as if the electronic device and a registration server are located on board a vehicle such as an aircraft. The signal diagram 200 includes the electronic device 205 (such as the electronic device 105 as discussed with respect to FIG. 1), a registration server 214 (such as the registration server 114 as discussed with respect to FIG. 1), an SMSC 212 (such as the SMSC 112 as discussed with respect to FIG. 1), and an HLR 215 (such as the HLR 115 as discussed with respect to FIG. 1).

To initiate the ground-based network registration, the electronic device 205 can download and install (216) a communication application. In particular, a user can cause the electronic device 205 to connect to an application server and download the communication application from the application server. The electronic device 205 may then locally install the communication application. According to embodiments, the electronic device 205 may need to communicate with the registration server 214 so the registration server 214 may create or set up an account for the communication application. Accordingly, the electronic device 205 and the registration server 214 can exchange (218) handshake messages and establish a communication channel, such as by using the transport layer security or secure sockets layer (TLS/SSL) protocol, as understood in the art.

The registration server 214 can send (220) a unique code to the electronic device 205 via the communication channel established in (218). A user of the electronic device 205 can compose a registration SMS message that includes the unique code. In embodiments, the user may use a dedicated messaging application or the communication application itself to compose the registration SMS message. The electronic device 205 can use, as a destination of the SMS message, a short code (e.g., an established five- or six-digit code) corresponding to the SMSC 212. Accordingly, the electronic device 205 can send (222) the SMS message with the unique code to the SMSC 212. After receiving the SMS message, the SMSC 212 can forward (224) the SMS message to the registration server 214. In some embodiments, the electronic device 205 can send the SMS message with the unique code directly to the registration server 214.

Generally, the SMS message from the electronic device includes a unique identification of a subscription that the electronic device 205 has with a cellular communications service provider, such as a provider that manages the home location register 215. For example, the subscription identification can be a telephone number associated with the SIM card in the electronic device 205. The subscription identification is different from an identification of the electronic device 205 itself. For example, the subscription identification can be the mobile subscriber integrated services digital network-number (MSISDN) and the electronic device identification can be the international mobile subscriber identity (IMSI). Of course, the subscription identification can be associated with the electronic device identification. In particular, the HLR 215 of home network of the electronic device 205 can associate an MSISDN for a user subscription with an IMSI of the electronic device 205 for use with that subscription. Although the subscription identification is described as the MSISDN and the electronic device identification is described as the IMSI, it should be appreciated that other subscription and electronic device identifications are envisioned.

According to embodiments, to facilitate the ground-based registration of the electronic device 205, the registration server 214 can reconcile the subscription identification (e.g., MSISDN) with the electronic device identification (e.g., IMSI). In operation, the registration server 214 can request (226) the HLR 215 of a home network for the IMSI associated with the MSISDN that was indicated in the SMS message received in (224). The HLR 215 of the corresponding cellular communications service provider can maintain a database that includes associations between IMSIs and MSISDNs for electronic devices having a subscription with the cellular communications service provider. Responsive to receiving the request, the HLR 215 can retrieve the IMSI for the electronic device 205 based on the received MSISDN and send (228) the IMSI to the registration server 214. In some embodiments, the IMSI received from the HLR 215 may be true (i.e., authentic) or pseudo (i.e., not authentic). Accordingly, the registration server 214 can request (230) the authenticity of the IMSI from the HLR 215 and the HLR 215 can send (232) an authenticity status to the registration server 214.

In some embodiments, the type of the electronic device 205 may vary. For example, the electronic device 205 may be equipped for the global system for mobile communications (GSM) access protocol or for the code division multiple access (CDMA) access protocol. Accordingly, the registration server 214 may send requests to the HLR 215 that are based on the access protocol type of the electronic device 205. It should be appreciated that other access protocols are envisioned.

As illustrated in FIG. 2, the electronic device 205 can establish (234) a secure connection with the registration server 214, such as an HTTPS connection. It should be appreciated that the secure connection may be established at any time, such as in response to the handshake message exchange (218) or in response to the retrieval and authentication of the IMSI. The registration server 214 can determine (236), based on the authenticity status received from the HLR 215, whether the IMSI of the electronic device 205 is authentic. If the IMSI is authentic ("YES"), the registration server 214 can create (238) an account for the electronic device 205 using the retrieved IMSI. In particular, the account can be associated with the communication application installed on the electronic device 205, and the account can associate the MSISDN of the electronic device 205 included in the original SMS with the IMSI retrieved from the HLR 215, or can otherwise include the IMSI retrieved from the HLR 215. The registration server 214 can also request the electronic device 205 (or the user thereof) for user credentials (e.g., a username and password) to associate with the account.

The electronic device 205 can request (240) the registration server 214 for a digital certificate, for example by sending a certificate signing request (CSR). The registration server 214 (or more particularly, a certificate authority thereof) can generate the certificate and issue/provide (242) the certificate to the electronic device 205. According to embodiments, the registration server 214 can generate the certificate using the IMSI retrieved from the HLR 215, whereby the serial number of the certificate can include a portion or all of the IMSI. The electronic device 205 can then store (243) the certificate for future use. Processing may then proceed to (248), or to other processing.

In (236), if the IMSI is not authentic ("NO"), the registration server 214 can create (244) an account for the electronic device 205 with partial information. In particular, the account can be associated with the communication application installed on the electronic device 205, and the account can include the MSISDN of the electronic device 205 and optionally the IMSI retrieved from the HLR 215, along with an indication that the IMSI is invalid. The registration server 214 can also notify (246) the electronic device 205 that registration of the communication application must be completed at a later time, such as when the electronic device 205 is connected to an air-based network. At (248), the electronic device 205 or the registration server 214 can terminate the secure connection. At this point, the ground-based registration of the electronic device 205 may be deemed complete.

Figure 3:
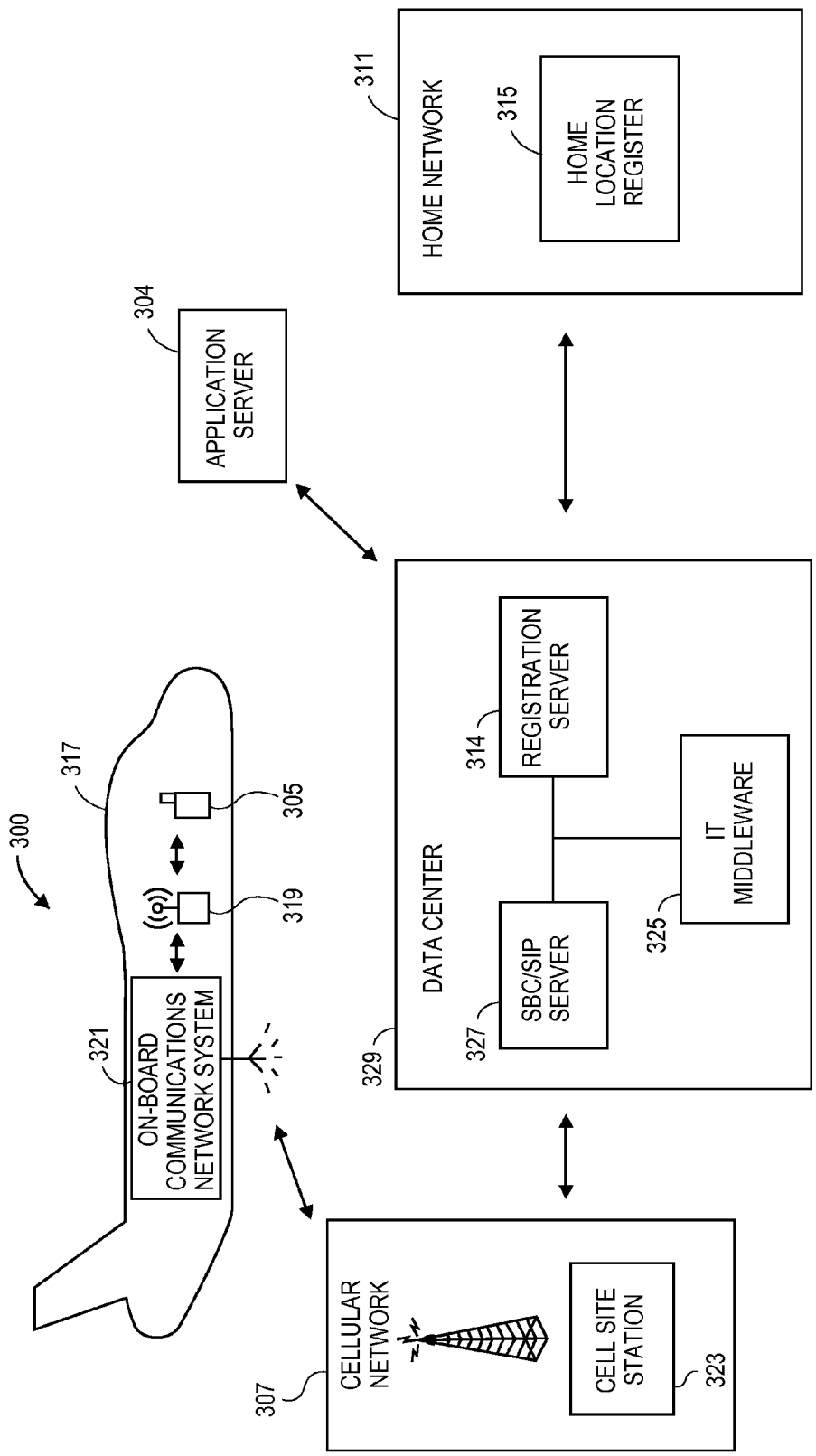
FIG. 3 illustrates an exemplary representation of electronic devices and components capable of facilitating an air-based registration of an electronic device, in accordance with some embodiments.

After the ground-based registration as described with respect to FIGS. 1 and 2 is complete and the communication application account is created, the electronic device 105 is partially configured for cellular-based communication via a non-terrestrial or air-borne network. It particular, the cellular-based communication may be understood to be sending and receiving text messages (e.g., SMS messages), placing and receiving voice calls, and roaming among cellular-based networks. As an added layer of security, an air-based (i.e., non-terrestrial network-based) registration may be completed to enable the electronic device to perform the cellular-based communications. FIG. 3 illustrates an example representation 300 of components configured to facilitate an air-based registration of an electronic device 305 (such as the electronic device 105 as discussed with respect to FIG. 1) with a registration server 314 (such as the registration server 114 as discussed with respect to FIG. 1). According to embodiments, the air-based registration may be facilitated when the electronic device 305 cannot easily connect to a ground-based network, such as when the electronic device 305 is located on an aircraft.

As illustrated in FIG. 3, the electronic device 305 is transported by or otherwise located within a vehicle 317. In embodiments, the vehicle 317 may be owned and/or operated by an individual, or the vehicle may be owned and/or operated by a company, organization or governmental entity. The vehicle may be one of a fleet of vehicles. The vehicle 317 may be used to transport passengers who pay for or otherwise are granted passage on the vehicle. The vehicle 317 may be used to transport executives or staff of a company or organization and their guests. The vehicle 317 may be used to transport live or inanimate cargo, packages, mail, and/or other types of passengers or cargo. Furthermore, although FIG. 3 depicts the vehicle 317 as an aircraft, the techniques and principles described herein equally apply to other types of vehicles such as trucks, automobiles, busses, trains, boats, ships, barges, subway cars, helicopters, ambulances or other emergency vehicles, military vehicles, other air-borne, water-borne, or land-borne vehicles, and vehicles that are suitable for space travel.

The vehicle 317 is equipped with a wireless access point 319 and an on-board communications network system 321. At any given moment in time, the on-board communications network system 321 may be in communicative connection with one or more data or communications networks that are disposed, managed, and/or hosted, for the most part (if not entirely), externally to the vehicle 317. For example, an external network may be a public, ground-based data or communications network, such as the Internet and/or the PSTN (Public Switched Telephone Network). The external network may also be a ground-based private data and/or communications network. Further, the external network may be a cellular network 307 that includes a cell site station 323. Typically, ground systems and ground computing devices may be essentially fixed in location, and base stations or infrastructure containing equipment via which devices may wirelessly access the ground system may be contained in one or more buildings or other structures that are fixedly attached to the ground or to earth.

The electronic device 305 can connect to the on-board communications network system 321 via the wireless access point 319. Generally, the on-board communications network system 321 may be disposed, managed, and/or hosted entirely on-board the vehicle 317. For example, the on-board communications network system 321 may be a Wi-Fi network that is contained and operates within the cabin of the vehicle 317. The on-board communications network system 321 may utilize any known communication protocol or combinations thereof, such as a wireless protocol, a wired protocol, other ARINC standard-compatible protocols, or a private protocol. In an example, the on-board communications network system 321 utilizes an IEEE 802.11 compatible protocol to communicate with the electronic device 305. In another example, the on-board communications network system 321 utilizes a hypertext transfer protocol (HTTP) and a Near Field Communications (NFC)-compatible protocol (e.g., Bluetooth®) to communicate with the electronic device 305.

The on-board communications network system 321 can also facilitate and manage communications between the electronic device 305 and the cell site station 323 of the cellular network 307. According to embodiments, the on-board communications network system 321 and the cell site station 323 may collectively make up an air-to-ground (ATG) communication network for aircraft use. In embodiments, the on-board communications network system 321 and the cell site station 323 can facilitate any type of data communication via any wireless standard or technology (e.g., GSM, CDMA, TDMA, WCDMA, LTE, EDGE, OFDM, GPRS, EV-DO, UWB, and others).

The cell site station 323 of the cellular network 307 can connect, via one or more various wired or wireless networks, to a ground-based data center 329 having components for facilitating the air-based registration of the electronic device 305 and enabling the electronic device 305 to securely perform cellular-based communications. In particular, the cell site station 323 includes a session border controller (SBC) and session initiation protocol (SIP) server 327 (which may be separate servers or combined into the same server), IT middleware 325, and the registration server 314. The SBC/SIP server 327 can facilitate and manage communication sessions between the electronic device 305 and the data center 329 using the SIP signaling communications protocol. The IT middleware 325 may record and verify product or service purchases made via the communication application on the electronic device 305. For example, the IT middleware 325 may authenticate the purchase, by a user of the electronic device 305, of an hour of network connectivity during a flight. The data center 329 may connect, via one or more various wired or wireless networks, to an application server 304 (such as the application server 104 as discussed with respect to FIG. 1) to facilitate the purchase of the selected products or services. Further, the data center 329 may also connect to a home network 311 and related HLR 315 associated with the electronic device 305 (such as the home network 111 and HLR 115 as discussed with respect to FIG. 1) to facilitate the cellular-based communications between the electronic device 305 and an end device/user.

Figure 4:
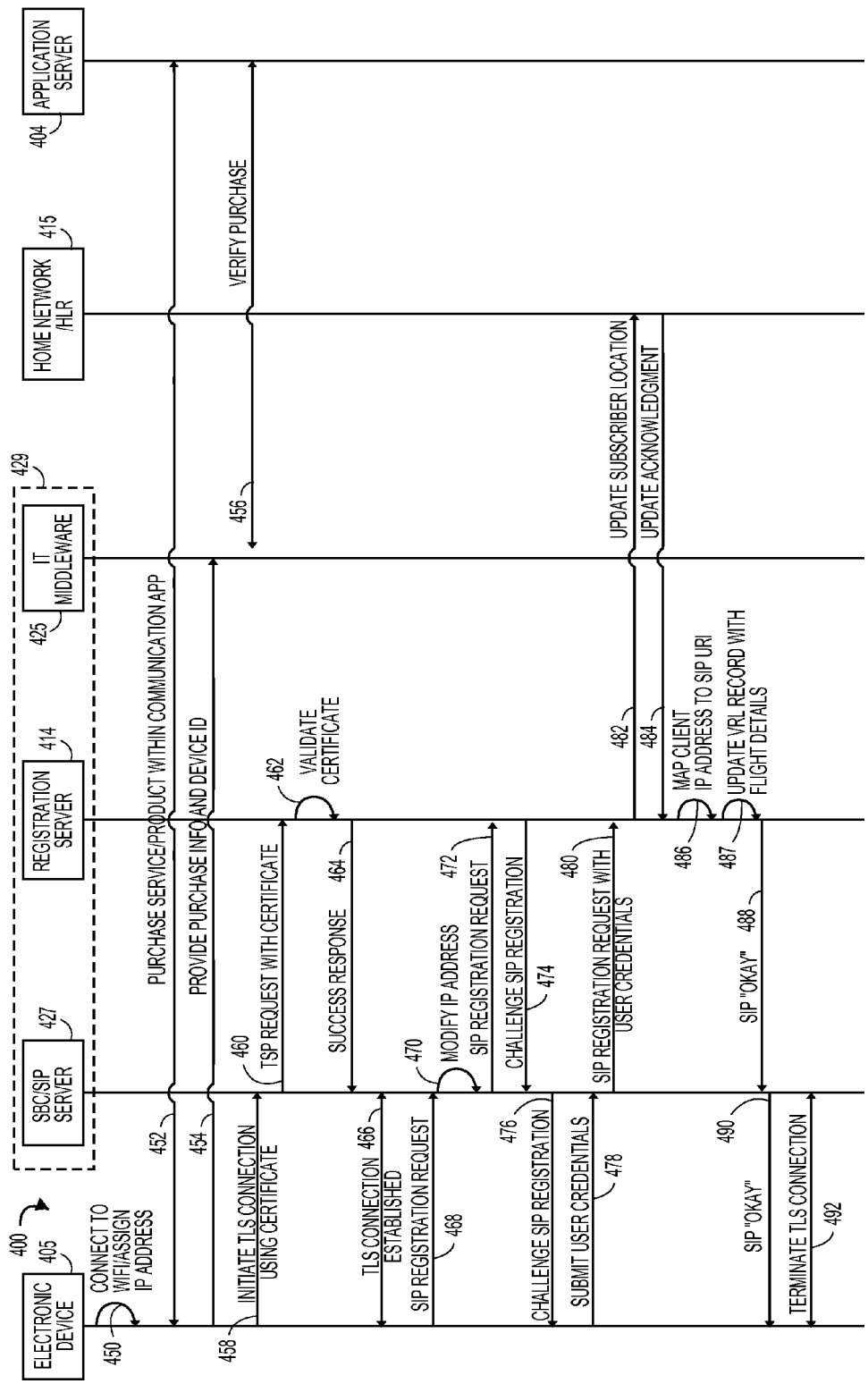
FIG. 4 depicts an example signal diagram associated with facilitating an air-based registration of an electronic device, in accordance with some embodiments.

FIG. 4 illustrates a signal diagram 400 associated with facilitating a non-terrestrial-based (i.e., air-based) registration. The signal diagram 400 includes an electronic device 405 (such as the electronic device 305 as discussed with respect to FIG. 3) and a data center 429 (such as the data center 329 as discussed with respect to FIG. 3). The data center 429 includes an SBC/SIP server 427 (such as the SBC/SIP server 327 as discussed with respect to FIG. 3), a registration server 414 (such as the registration server 314 as discussed with respect to FIG. 3), IT middleware 425 (such as the IT middleware 325 as discussed with respect to FIG. 3), an HLR 415 (such as the HLR 315 as discussed with respect to FIG. 3), and an application server 404 (such as the application server 304 as discussed with respect to FIG. 3). According to embodiments, the signal diagram 400 may be facilitated while the electronic device 405 is connected to a non-terrestrial-based network, such as while the electronic device 405 is in flight on an aircraft. Further, the signal diagram 400 may be facilitated after the electronic device 405 has completed the ground-based registration as discussed with respect to FIG. 2. It should be appreciated that the electronic device 405 communicates with the various components (427, 414, 425, 404) via the on-board communications network system of the aircraft, as described with respect to FIG. 3. Accordingly, the "electronic device" 405 as described with respect to FIG. 4 can be understood to also include the on-board communication network system.

As illustrated in FIG. 4, the electronic device 405 can connect (450), via a wireless access point, to the on-board communications network system of the aircraft, and the on-board communications network system may assign the electronic device 405 an internet protocol (IP) address. A user of the electronic device 405 may also initiate the communication application installed on the electronic device 405, whereby the communication application retrieves information about the flight (e.g., flight number, duration, departure time, landing time) from the on-board communications network system.

The user of the electronic device 405 can use the communication application to communicate with the application server 404 and select to purchase (452) a service or product from a list of services or products available through the application server 404. In embodiments, list of services or products may include various cellular connectivity options for the electronic device 405 that are based on time durations, data limits, or other parameters. For example, the list of services or products can include an option for two hours of connectivity on a particular flight. According to embodiments, the on-board communications network system can "whitelist" a location (e.g., a uniform resource locator (URL)) of the application server 404 (as well as a location associated with the data center 429 through which the electronic device 405 connects to the application server 404) so that the electronic device 405 may connect to the application server 404 to facilitate the purchase of the service or product. It should be appreciated that some systems may not require the purchase of the product or service from the application server 404. Accordingly, the electronic device 405 may initiate a connection attempt with the SBC/SIP server 427 without having to purchase the product or service via the communication application.

After the user has selected a service or product option, the electronic device 405 can provide (454) purchase information and an identification (e.g., its MSISDN and/or IMSI) to the IT middleware 425. The IT middleware 425 may verify (456) the purchase of the service or product with the application server 404, such as through a check status request and response. The electronic device 405 can initiate (458) a transport layer security (TLS) connection with the SBC/SIP server 427 using a digital certificate. In particular, the certificate can be the certificate that the registration server 214 issues to the electronic device 205 during the ground-based registration as discussed with respect to FIG. 2. In this case, the SBC/SIP server 427 may act as a registration authority (RA) for the electronic device 405 and can request (460) the registration server 414 for a status of the certificate. The registration server 414 (acting as the certificate authority (CA)) can validate (462) the certificate and send (464) a success response to the SBC/SIP server 427. Responsive to receiving the success response, the SBC/SIP server 427 can establish (466) the TLS connection with the electronic device 405.

After the TLS connection is established, the electronic device 405 can perform a session initiation protocol (SIP) registration by sending (468) a SIP registration request over the TLS connection to the SBC/SIP server 427. In embodiments, the SIP registration request can include a uniform recourse indicator (URI) that indicates the IMSI and/or MSISDN associated with the electronic device 405, as well as the IP address that was assigned in (450). The SBC/SIP server 427 can decrypt the SIP registration request and modify (470) the IP address associated with the electronic device 405. In particular, the SBC/SIP server 427 can modify the IP address to generate a care-of address (CoA) for the electronic device 405. Further, the SBC/SIP server 427 can send (472) an SIP registration request to the registration server 414. In an optional implementation, the registration server 414 can challenge the SIP registration request by requiring user credentials associated with the electronic device 405, or more particularly user credentials of the communication application. Accordingly, the registration server 414 can send (474) an SIP challenge request to the SBC/SIP server 427, and the SBC/SIP server 427 can forward the SIP challenge request to the electronic device 405. A user of the electronic device 405 can input user credentials (or the electronic device 405 can automatically populate the user credentials) and the electronic device 405 can submit (478) the user credentials to the SBC/SIP server 427. The SBC/SIP server 427 can send (480) the SIP registration request with the user credentials to the registration server 414. The registration server 414 can then validate (or reject) the user credentials.

After validating the user credentials, the registration server 414 can update (482) a location of the electronic device 405 (or subscriber thereof) with the HLR 415 of the home network of the electronic device 405 so that the location of the electronic device 405 is known to the home network. According to embodiments, the location update request can include the IMSI of the electronic device 405. The HLR 415 can provide (484) a location update acknowledgement to the registration server 414. The registration server 414 can map (486) the CoA of the electronic device 405 generated in (470) to the URI (e.g., IMSI and/or MSISDN) included in the SIP registration request from the electronic device 405 in (468).

If desired, the registration server 414 may update (487) a corresponding record of the registration server's 414 VLR (or other similar register or listing) to indicate various information associated with the vehicle on which the electronic device 405 is traveling. For example, the registration server 414 can update the record to include flight details such as flight type (e.g., commercial aviation or business aviation), flight number, airline, aircraft ID, and/or other data, as well as toggle a corresponding call delivery field that enables incoming calls to be connected to the electronic device 405. In this way, the registration server 414 is able to disable incoming calls that are intended for the electronic device 405 so as to comply with any applicable laws, regulations, or guidelines. The registration server 414 can send (488) an SIP "okay" response to the SBC/SIP server 427 and the SBC/SIP server 427 can forward (490) the SIP "okay" response to the electronic device 405. The two part registration of the electronic device 405 may now be deemed complete, and the electronic device 405 and the SBC/SIP server 427 can terminate (492) the TLS connection.

After the two-part registration of the electronic device 405 is complete, the electronic device 405 is configured for cellular-based communications according to the service or product plan selected in (452). In particular, the registration server 414 users the various identifications and mappings (e.g., IMSI, MSISDN, generated CoA) to facilitate communications that originate from or are intended for the electronic device 405. For example, an SMS message originating from the electronic device 405 is sent to the registration server 414 via the on-board communications network system of an airplane, and the registration server 414 can modify various data of the SMS message so that when the registration server 414 sends the SMS message to a destination device, the destination device presents the SMS message to its user as if the electronic device 405 initiated the SMS message via a conventional cellular-based network.

Figure 5:
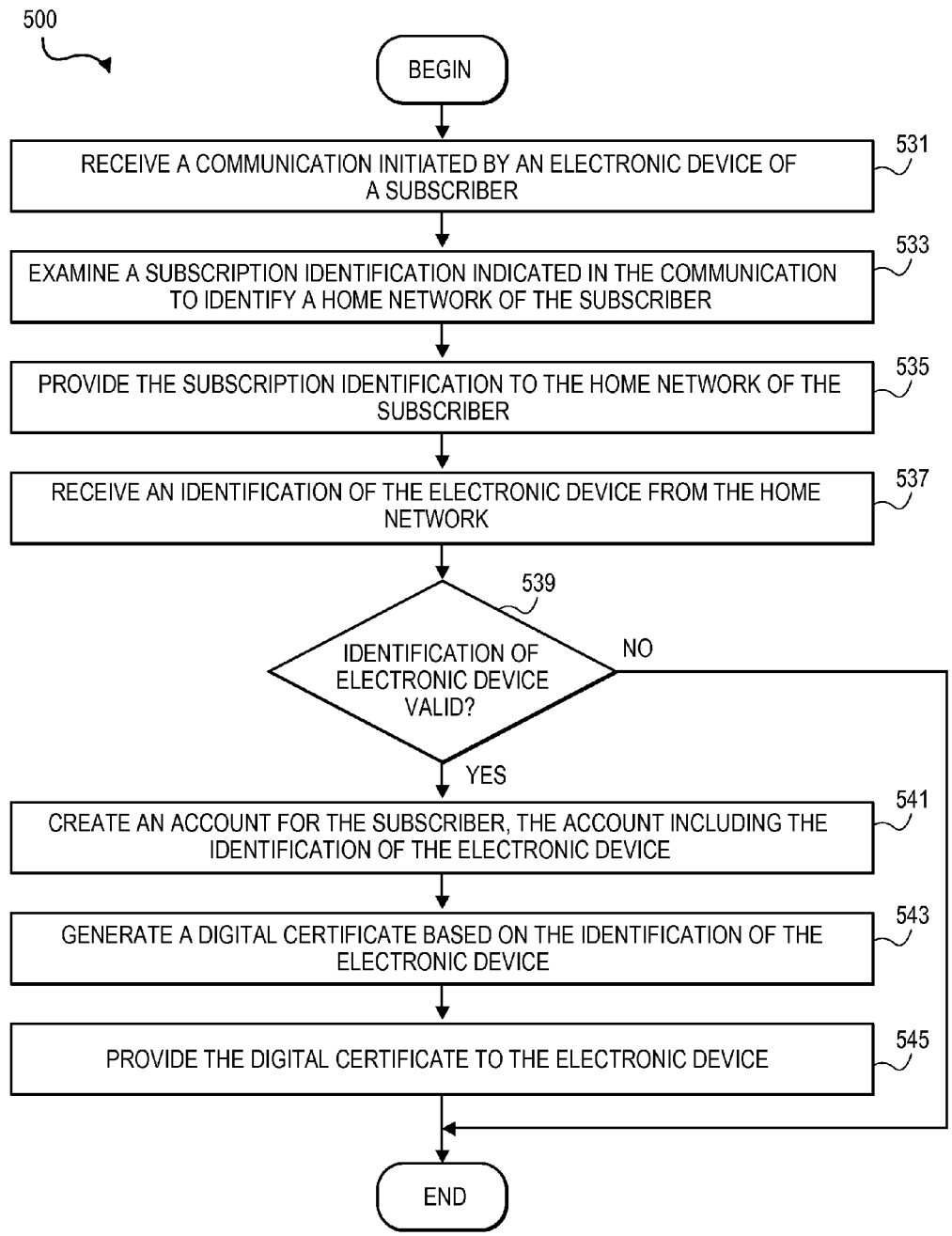
FIG. 5 depicts a flow diagram of a registration server facilitating a ground-based registration of an electronic device, in accordance with some embodiments.

FIG. 5 illustrates an example method 500 for facilitating a ground-based registration of an electronic device. The method 500 may operate in conjunction with any or all portions of the systems, vehicles and/or electronic devices previously discussed with respect to FIGS. 1-4, or the method 500 may operate in conjunction with other suitable systems, vehicles, and/or electronic devices. In an embodiment, at least a portion of the method 500 may be performed by a registration server, such as the registration server 214 as described with respect to FIG. 2.

At a block 531, the registration server may receive a communication initiated by an electronic device of a subscriber. The communication may be an SMS message including a unique registration code and may be received by the registration server via an SMSC. At block 533, the registration server may examine a subscription identification that is indicated in the communication to identify a home network of the subscriber. In particular, the subscription identification may be an MSISDN associated with the electronic device, where the MSIDSN indicates a cellular communications service provider with which the subscriber has a cellular services plan.

At block 535, the registration server may provide the subscription identification to the home network of the subscriber. As discussed herein, the HLR of the home network stores an association between the subscription identification (e.g., the MSISDN) and an electronic device identification (e.g., IMSI) so as to permit or authorize communications to and from the electronic devices that are registered with the subscription. At block 537, the registration server may receive an identification of the electronic device (e.g., the IMSI of the electronic device) from the home network, whereby an HLR of the home network associates the identification of the electronic device with the subscription identification. At block 539, the registration server may also determine the validity of the identification. In particular, the registration server may request the authenticity of the identification of the electronic device from the home network, and the home network may respond with an authenticity status.

If the identification of the electronic device is not valid ("NO"), processing may end or proceed to other functionality. If the identification of the electronic device is valid ("YES"), processing can proceed to block 541 at which the registration server may create an account for the subscriber, where the account includes the identification of the electronic device. In particular, the account may be associated with a communication application installed on the electronic device and may also have an associated set of credentials for the subscriber who is using the electronic device.

At block 543, the registration server may generate a digital certificate based on the identification of the electronic device. In particular, the registration server may generate the digital certificate with a serial number having at least a portion of the IMSI of the electronic device. At block 545, the registration server may provide the digital certificate to the electronic device via a secure connection.

Figure 6:
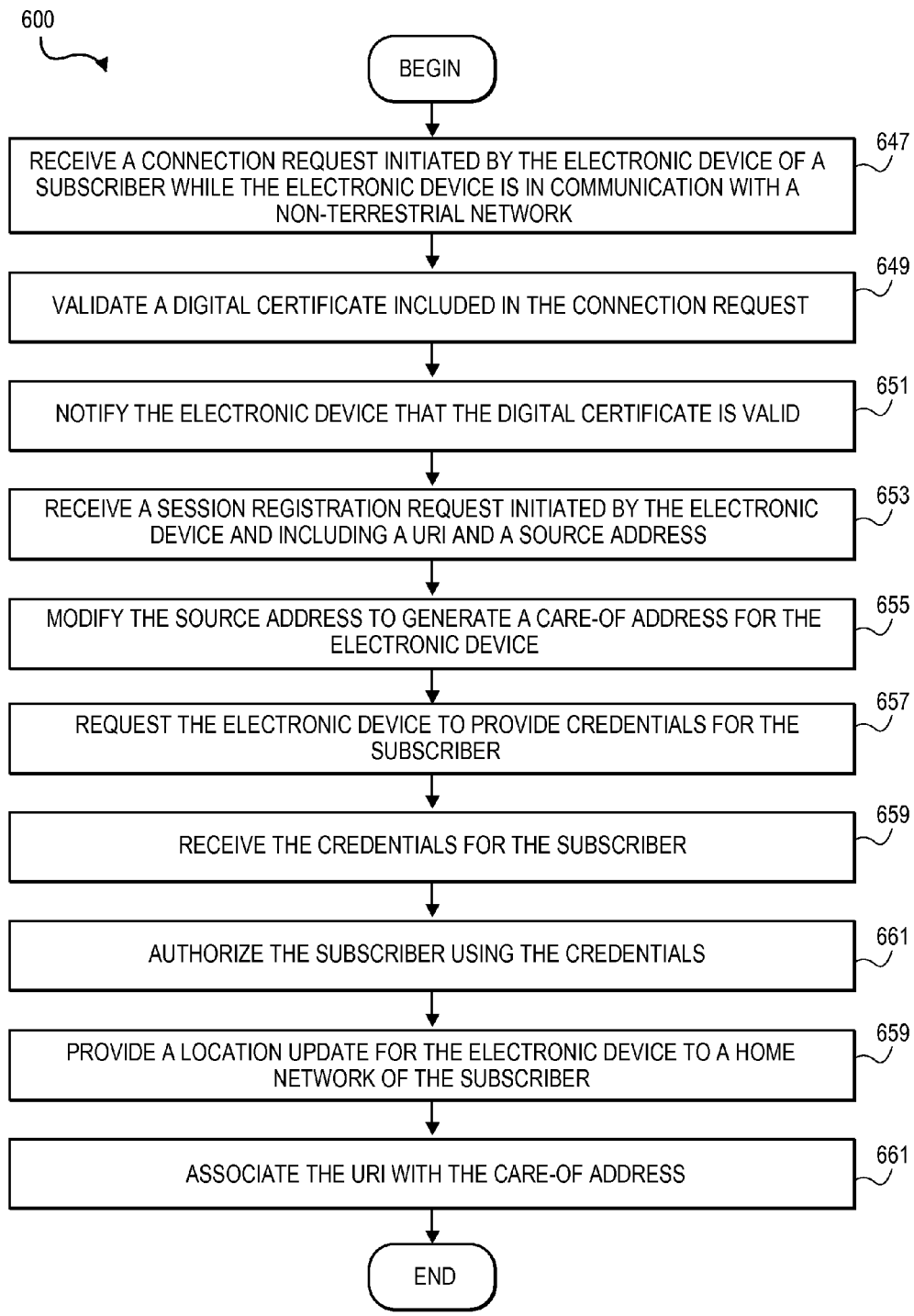
FIG. 6 depicts a flow diagram of a registration server facilitating an air-based registration of an electronic device, in accordance with some embodiments.

FIG. 6 illustrates an example method 600 for facilitating a non-terrestrial-based (i.e., air-based) registration of an electronic device. The method 600 may operate in conjunction with any or all portions of the systems, vehicles and/or electronic devices previously discussed with respect to FIGS. 1-4, or the method 600 may operate in conjunction with other suitable systems, vehicles, and/or electronic devices. In an embodiment, at least a portion of the method 600 may be performed by a registration server, such as the registration server 414 as described with respect to FIG. 4 or the registration server that performs the method 500 as discussed with respect to FIG. 5. Further, the registration server may perform the method 600 after conducting the ground-based registration as discussed with respect to FIG. 5.

At a block 647, the registration server may receive a connection request initiated by the electronic device of a subscriber while the electronic device is in communication with a non-terrestrial network. In particular, the communication may be a TLS connection request and may include the digital certificate generated at block 543 of the method 500. Further, the registration server may receive the communication via an on-board communications network system of a vehicle (e.g., an airplane) in which the electronic device is located. At block 649, the registration server may validate the digital certificate included in the connection request. In embodiments, the registration server performs the validation by comparing the digital certificate included in the connection request to a local copy of the digital certificate.

At block 651, the registration server may notify the electronic device that the digital certificate is valid. Accordingly, the electronic device may initiate an SIP registration and, at block 653, the registration server may receive a session registration request initiated by the electronic device, where the request includes a URI and a source address. In embodiments, the URI can include at least a portion of the IMSI and/or the MSISDN of the electronic and the source address can be an IP address assigned to the electronic device by the on-board communications network system. At block 655, the registration server may modify the source address to generate a care-of address (CoA) for the electronic device.

At block 657, in some optional implementations, the registration server may request the electronic device to provide credentials for the subscriber to complete the air-based registration. A user of the electronic device may populate (e.g., via the communication application) the credentials and at block 659, the registration server may receive the credentials for the subscriber. At block 661, the registration may authorize the subscriber by reconciling the received credentials with a stored version of the credentials. At block 663, the registration server may provide a location update for the electronic device to a home network of the subscriber so the electronic device is known to the home network. In particular, the registration server can send the IMSI of the electronic device to the home network and the home network can update its HLR. At block 665, the registration server may associate the URI received at block 653 with the CoA. In some embodiments, the registration server may also update a VLR to reflect certain data associated with the presence of the electronic device (e.g., flight data), so as to enable itself to control calls that are destined for the electronic device. The two-part registration of methods 500 and 600 may now be deemed complete, and the registration server may send a confirmation message to the electronic device as well as terminate the TLS session.

Figure 7:
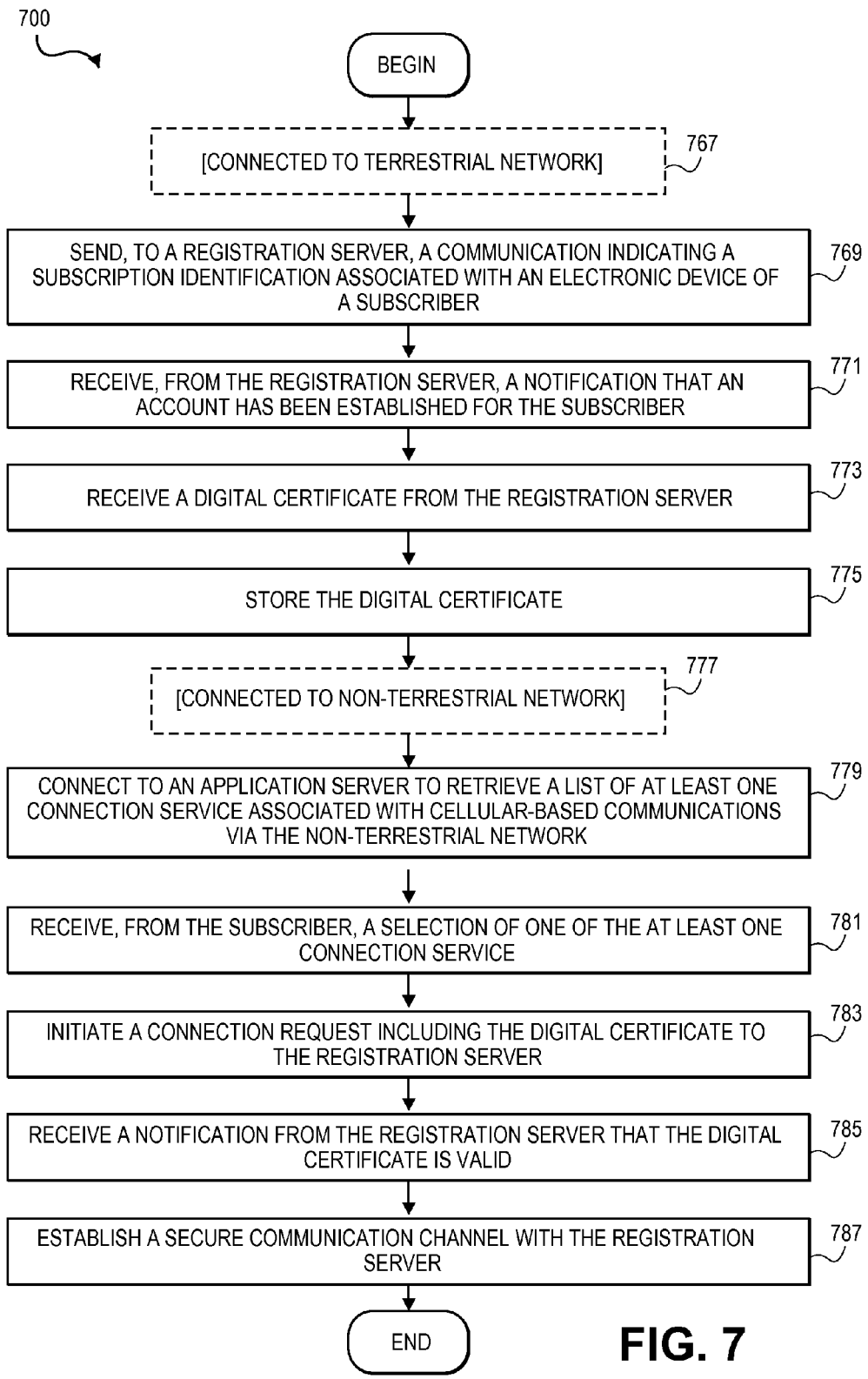
FIG. 7 depicts a flow diagram of an electronic device conducting a two-part registration, in accordance with some embodiments.

FIG. 7 illustrates an example method 700 for facilitating both a ground-based registration and a non-terrestrial (e.g., air-based) registration of an electronic device. The method 700 may operate in conjunction with any or all portions of the systems, vehicles and/or electronic devices previously discussed with respect to FIGS. 1-4, or the method 700 may operate in conjunction with other suitable systems, vehicles, and/or electronic devices. In an embodiment, at least a portion of the method 700 may be performed by an electronic device of a subscriber, such as the electronic devices 205, 405 as described with respect to FIGS. 2 and 4. The electronic device may have a communication application installed thereon to facilitate at least a portion of the method 700.

Block 767 of the method 700 indicates that the electronic device is connected to a terrestrial (i.e., ground-based) network. In particular, the electronic device may connect to a registration server via any type of ground-based LAN, PAN, or WAN. At block 769, the electronic device may send, to the registration server via the ground-based network, a communication indicating a subscription identification associated with the electronic device. In particular, the subscription identification may be the MSISDN associated with the electronic device and the communication may be an SMS message initiated by the communication application.

At block 771, the electronic device may receive, from the registration server, a notification that an account has been established for the subscriber. In embodiments, the account may be associated with the communication application installed on the electronic device. Further, the account may associate the subscription identification with an identification of the electronic device (e.g., the IMSI of the electronic device). At block 773, the electronic device may receive a digital certificate from the registration server. In some embodiments, the digital certificate may have a serial number that includes at least a portion of the electronic device identification (e.g., the IMSI). At block 775, the electronic device may store the digital certificate in local storage. At this point, the ground-based registration of the electronic device may be deemed complete.

After the ground-based registration of the electronic device is complete at block 777 of the method 700, the electronic device may connect to a non-terrestrial (i.e., air-based) network, such as an on-board communications network system of an aircraft. At block 779, the electronic device may connect (e.g., via the on-board communications network system) to an application server to retrieve a list of at least one connection service associated with cellular-based communications via the non-terrestrial network. For example, the connection services may correspond to service durations, data transfer limits, or other connectivity services. At block 781, the electronic device may receive, from the subscriber, a selection of one of the at least one connection service.

At block 783, the electronic device may initiate a connection request to the registration service, where the connection request can include the digital certificate received at block 773 as well as an indication of the connection service selected at block 781. At block 785, the electronic device may receive a notification from the registration server that the digital certificate is valid. In particular, the registration server can reconcile the digital certificate sent at block 783 with a copy of the digital certificate that was generated and issued during the ground-based registration. At block 787, the electronic device may establish a secure communication channel with the registration server that may be used to facilitate sending and receiving the cellular-based communications between the electronic device and end devices. At this point, the air-based registration (and consequently the two-part registration) may be deemed complete.

Figure 8:
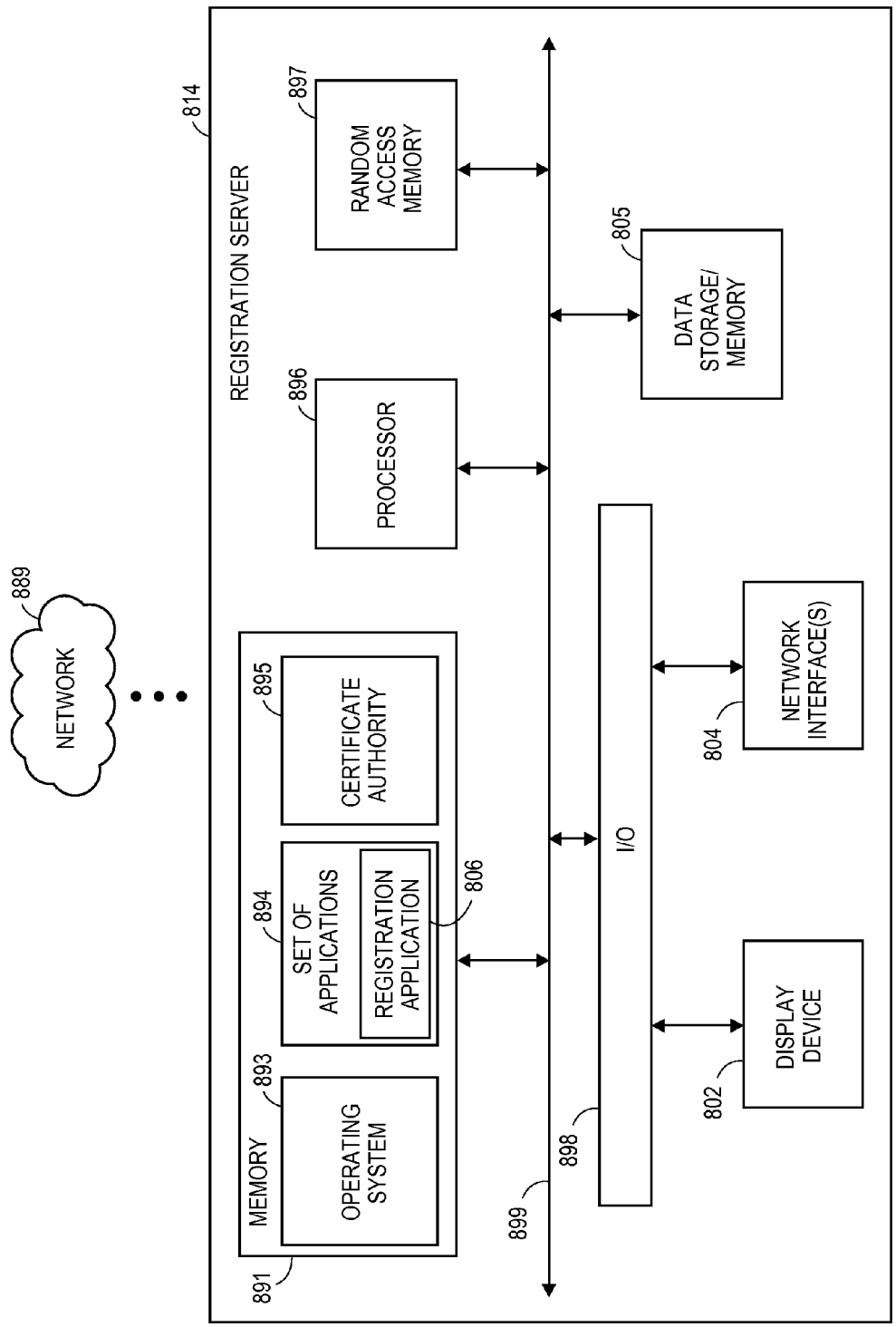
FIG. 8 is a block diagram of a registration server in accordance with some embodiments.

FIG. 8 illustrates a block diagram of an example registration server 814 which may operate in accordance with any of (and/or any one or more portions of) the systems, methods, techniques and concepts discussed herein. In an embodiment, the registration server 814 may be the registration servers 214, 414 as discussed with respect to FIGS. 2 and 4.

The registration server 814 may include a processor 896 (which may be called a controller, microcontroller or a microprocessor, in some embodiments) for executing computer-executable instructions, a program memory 891 for permanently storing data related to the computer-executable instructions, a random-access memory (RAM) or other suitable memory 897 for temporarily storing data related to the computer-executable instructions, and an input/output (I/O) circuit or component 898, all of which may be interconnected via an address/data bus or suitable bus 899. As used herein, the terms "computer-executable instructions," "computer executable instructions," and "instructions" are used interchangeably.

The registration server 814 may include one or more network interfaces 804 via which the registration server 814 may wirelessly connect with one or more respective networks 889 or devices. Generally, the network interfaces 804 enable the registration server 814 to connect to devices and entities over respective cellular radio frequency (RF) bands, e.g., AMPs, TDMA, CDMA, GSM, PCS, 3G, 4G, 5G, and/or any other terrestrial cellular radio frequency band. For example, the registration server 814 may communicate with an electronic device via a terrestrial base station or small cell using one or the network interfaces 804. Generally, the term "cellular radio frequency band," as used herein, refers to a portion of RF spectrum that is allocated by a governmental agency or other body which governs the usage of spectrum. The one or more network interfaces 804 may enable the registration server 814 to communicate over one or more cellular radio frequency bands (e.g., in terrestrial environments), and may include one or more corresponding transceivers. Although not shown in FIG. 8, the registration server 814 may also include one or more wireless network interfaces that enable the registration server 814 to communication via non-cellular-based networks, such as local area networks.

With further regard to FIG. 8, it should be appreciated that although only one processor 896 is shown, the registration server 814 may include multiple processors 896. Similarly, the memory of the registration server 814 may include multiple RAMs (Random Access Memories) 897, multiple program memories 891, and/or one or more other data storage entities or types of memories 805. The RAM(s) 897, program memories 891, and/or the data storage entities 805 may be implemented as one or more semiconductor memories, magnetically readable memories, optically readable memories, biological memories, and/or other tangible, non-transitory computer-readable storage media, for example.

Furthermore, the I/O circuit 898 may connect to a display device 802. For example, the display device 802 may enable a user or administrator of the registration server 814 to manage the registration functionalities. The registration server 814 may also include other elements common to general purpose computing devices (not shown).

The memory 891 can store an operating system 893 capable of facilitating the functionalities as discussed herein. The operating system 893 can be configured with (or be configured to interface with) a certificate authority 895 to generate and issue certificates for electronic devices. The processor 896 can interface with the memory 891 to execute the operating system 893 and the certificate authority 895, as well as execute a set of applications 894 comprising computer-executable electronic instructions for facilitating various registration features. In particular, the set of applications 894 can include a registration application 806 configured to facilitate the registration techniques as discussed herein. It should be appreciated that other applications are envisioned.

In some embodiments, the computer-executable instructions for the set of applications 894 may be configured to cause the registration server 814 to perform one or more portions of one or more of the methods described herein. The computer-executable instructions may be stored on a tangible, non-transitory computer-readable storage medium, such as on the memory 891 or on some other suitable memory. Furthermore, the computer-executable instructions may be executable by the one or more processors 896. The computer-executable instructions may be downloaded or otherwise delivered to the registration server 814.

FIG. 9 illustrates a block diagram of an example electronic device 905 which may operate in accordance with any of (and/or any one or more portions of) the systems, methods, techniques and concepts discussed herein. The electronic device 905 may be, for example, a smart phone, a smart device, a laptop, a tablet, an electronic reading device, or any other communications or computing device that is configured to communicate wirelessly. In an embodiment, the electronic device 905 may be the electronic device 205, 405 as described with respect to FIGS. 2 and 4.

The electronic device 905 may include a processor 996 (which may be called a controller, microcontroller or a microprocessor, in some embodiments) for executing computer-executable instructions, a program memory 991 for permanently storing data related to the computer-executable instructions, a random-access memory (RAM) or other suitable memory 997 for temporarily storing data related to the computer-executable instructions, and an input/output (I/O) circuit or component 998, all of which may be interconnected via an address/data bus or suitable bus 999. As used herein, the terms "computer-executable instructions," "computer executable instructions," and "instructions" are used interchangeably.

The electronic device 905 may include one or more wireless network interfaces 901 via which the electronic device 905 may wirelessly connect with one or more networks 989 or devices. In an embodiment, the one or more wireless network interfaces 901 enable the electronic device 905 to wirelessly connect to one or more other networks or devices that are included or contained in a terrestrial or a non-terrestrial environment. For example, the electronic device 905 may communicatively connect to a non-terrestrial, local network (e.g., a non-terrestrial wireless Local Area Network (LAN) hosted on-board a vehicle) using a wireless Ethernet protocol over one of the wireless network interfaces 901. Additionally or alternatively, the electronic device 905 may communicatively connect to a local wireless network or device using a Near Field Communications (NFC) protocol (e.g., Bluetooth) over one of the wireless network interfaces 901. Generally, the one or more wireless network interfaces 901 may support any radio frequency band other than cellular radio frequency bands, and the one or more wireless network interfaces 901 may include one or more corresponding transceivers. In an embodiment, the wireless network interfaces 901 communicates with a wireless access point (such as a wireless access point on an airplane), which allows the electronic device 905 to connect to an on-board network.

The electronic device 905 may further include one or more cellular wireless interfaces 904 to support communications over respective cellular radio frequency (RF) bands, e.g., AMPs, TDMA, CDMA, GSM, PCS, 3G, 4G, 5G, and/or any other terrestrial cellular radio frequency band. For example, the electronic device 905 may communicate with a terrestrial base station or small cell using one or the cellular network interfaces 904. Further, the electronic device 905 may communicate with a registration server (such as the registration server 814 as described with respect to FIG. 8) over a WAN using one of the cellular network interfaces 904. Generally, the term "cellular radio frequency band," as used herein, refers to a portion of RF spectrum that is allocated by a governmental agency or other body which governs the usage of spectrum. The cellular network interfaces 904 may allow the electronic device 905 to communicate over one or more cellular radio frequency bands (e.g., in terrestrial environments), and may include one or more corresponding transceivers. In an embodiment, the one or more cellular network interfaces 904 are not used by the electronic device 905 to communicate in non-terrestrial environments. In an embodiment, the one or more wireless network interfaces 901 and the one or more cellular network interfaces 904 may each be independently activated and deactivated.

With further regard to FIG. 9, it should be appreciated that although only one processor 996 is shown, the electronic device 905 may include multiple processors 996. Similarly, the memory of the electronic device 905 may include multiple RAMs (Random Access Memories) 997, multiple program memories 991, and/or one or more other data storage entities or types of memories 906. The RAM(s) 997, program memories 991, and/or the data storage entities 906 may be implemented as one or more semiconductor memories, magnetically readable memories, optically readable memories, biological memories, and/or other tangible, non-transitory computer-readable storage media, for example.

Furthermore, although the I/O circuit 998 is shown as a single block, it should be appreciated that the I/O circuit 998 may include a number of different types of I/O circuits or connections. For example, a first I/O circuit may correspond to a display device 902, and the first or a second I/O circuit may correspond to a user interface 903. The user interface 903 in combination with the display device 902 may include various I/O components (e.g., capacitive or resistive touch sensitive input panels, keys, buttons, lights, LEDs, cursor control devices, haptic devices, and others). In embodiments, the display device 902 may be a touchscreen display using singular or combinations of display technologies and can include a thin, transparent touch sensor component superimposed upon a display section that is viewable by a user. For example, such displays include capacitive displays, resistive displays, surface acoustic wave (SAW) displays, optical imaging displays, and the like. The user interface 903 may further include an audio components such as a microphone and/or a speaker. The electronic device 905 may also include other elements common to general purpose computing devices (not shown).

The memory 991 can store an operating system 993 capable of facilitating the functionalities as discussed herein. The processor 996 can interface with the memory 991 to execute the operating system 993 as well as execute a set of applications 994 comprising computer-executable electronic instructions for facilitating various registration features. In particular, the set of applications 994 can include a communication application 907 configured to facilitate the registration techniques as discussed herein. For example, the communication application 907 can communicate with a registration server to receive a digital certificate and store the digital certificate in the memory 991. It should be appreciated that other applications are envisioned, such as a dedicated SMS messaging application.

In some embodiments, the computer-executable instructions for the set of applications 994 may be configured to cause the electronic device 905 to perform one or more portions of one or more of the methods described herein. The computer-executable instructions may be stored on a tangible, non-transitory computer-readable storage medium, such as on the memory 991 or on some other suitable memory. Furthermore, the computer-executable instructions may be executable by the one or more processors 996. The computer-executable instructions may be downloaded or otherwise delivered to the electronic device 905.

Of course, the applications and benefits of the systems, methods and techniques described herein are not limited to only the above examples. Many other applications and benefits are possible by using the systems, methods and techniques described herein.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims. Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A method of registering an electronic device of a subscriber, the method comprising:
   facilitating a ground-based network registration comprising:
      receiving a communication initiated by the electronic device,
      retrieving, using information in the communication, an identification of the electronic device from a home network of the subscriber, and
      creating, with one or more processors, an account for the subscriber, the account including the identification of the electronic device; and
   after facilitating the ground-based network registration, facilitating a non-terrestrial network-based registration comprising:
      receiving a connection request initiated by the electronic device while the electronic device is in communication with a non-terrestrial network,
      responsive to receiving the connection request, establishing a secure communication channel with the electronic device, and
      providing an update for the electronic device to the home network of the subscriber.

2. The method of claim 1, wherein receiving the communication initiated by the electronic device comprises:
   examining a subscription identification indicated in the communication to identify the home network of the subscriber.

3. The method of claim 2, wherein retrieving the identification of the electronic device comprises:
   providing the subscription identification to the home network of the subscriber, and
   receiving the identification of the electronic device from the home network.

4. The method of claim 1, wherein facilitating the ground-based network registration further comprises:
   generating a digital certificate based on the identification of the electronic device, and
   providing the digital certificate to the electronic device.

5. The method of claim 4, wherein the connection request initiated by the electronic device includes the digital certificate, and wherein establishing the secure communication channel with the electronic device comprises:
   validating the digital certificate, and
   notifying the electronic device that the digital certificate is valid.

6. The method of claim 1, wherein facilitating the non-terrestrial network-based registration further comprises:
   requesting the electronic device to provide credentials for the subscriber,
   receiving the credentials for the subscriber, and
   authorizing the subscriber using the credentials.

7. The method of claim 1, wherein providing the update for the electronic device to the home network of the subscriber comprises:

providing a location update for the electronic device to the home network, wherein the home network updates a location registry with the location update.

8. The method of claim 1, wherein facilitating the non-terrestrial network-based registration further comprises:
receiving a session registration request initiated by the electronic device, the session registration request including a uniform resource indicator (URI) and a source address,
modifying the source address to generate a care-of address (CoA) for the electronic device, and
associating the URI with the CoA.

9. A system for registering an electronic device of a subscriber, comprising:
an interface configured to provide at least one communicative connection to a ground-based network, a non-ground-based network, and a home network of the subscriber; and
a registration server communicatively connected to the interface and configured to:
when the electronic device is connected to the ground-based network:
receive, via the interface, a communication initiated by the electronic device,
retrieve, using information in the communication, an identification of the electronic device from the home network of the subscriber, and
create an account for the subscriber, the account including the identification of the electronic device; and
after the account is created for the subscriber:
receive, via the interface, a connection request initiated by the electronic device while the electronic device is in communication with the non-ground-based network,
responsive to receiving the connection request, establish a secure communication channel with the electronic device, and
provide, via the interface, an update for the electronic device to the home network of the subscriber.

10. The system of claim 9, wherein when the electronic device is connected to the ground-based network, the registration server is further configured to:
examine a subscription identification indicated in the communication to identify the home network of the subscriber.

11. The system of claim 10, wherein when the electronic device is connected to the ground-based network, the registration server is further configured to:
provide the subscription identification to the home network of the subscriber, and
receive the identification of the electronic device from the home network.

12. The system of claim 9, wherein when the electronic device is connected to the ground-based network, the registration server is further configured to:
generate a digital certificate based on the identification of the electronic device, and
provide the digital certificate to the electronic device.

13. The system of claim 12, wherein the connection request initiated by the electronic device includes the digital certificate, and wherein the registration server is further configured to:
validate the digital certificate, and
notify the electronic device that the digital certificate is valid.

14. The system of claim 9, wherein after the account is created for the subscriber, the registration server is further configured to:
request the electronic device to provide credentials for the subscriber,
receive the credentials for the subscriber, and
use the credentials to authorize the subscriber.

15. The system of claim 9, wherein the update for the electronic device is a location update that the registration server provides to the home network, and wherein the home network updates a location registry with the location update.

16. The system of claim 9, wherein after the account is created for the subscriber, the registration server is further configured to:
receive a session registration request initiated by the electronic device, the session registration request including a uniform resource indicator (URI) and a source address,
modify the source address to generate a care-of address (CoA) for the electronic device, and
associate the URI with the CoA.

17. A method in an electronic device of registering the electronic device of a subscriber, the method comprising:
facilitating a ground-based network registration comprising:
sending a communication indicating a subscription identification to a registration server, wherein the registration server uses the subscription identification to retrieve an identification of the electronic device from a home network of the subscriber, and
receiving, from the registration server, a notification that an account has been established for the subscriber using the identification of the electronic device; and
after facilitating the ground-based network registration, facilitating a non-terrestrial network-based registration comprising:
initiating a connection request to the registration server while the electronic device is in communication with a non-terrestrial network, and
responsive to initiating the connection request, establishing a secure communication channel with the registration server, wherein the registration server provides an update for the electronic device to the home network of the subscriber.

18. The method of claim 17, wherein facilitating the ground-based network registration further comprises:
receiving a digital certificate from the registration server, wherein the registration server generates the digital certificate based on the identification of the electronic device, and
storing the digital certificate.

19. The method of claim 18, wherein the connection request includes the digital certificate, and wherein establishing the secure communication channel with the registration server comprises:
receiving a notification from the registration server that the digital certificate is valid.

20. The method of claim 17, wherein facilitating the non-terrestrial network-based registration further comprises:
connecting to an application server to retrieve a list of at least one connection service associated with cellular-based communication via the non-terrestrial network, and
receiving, from the subscriber, a selection of one of the at least one connection service.

* * * * *